(12) United States Patent
Tsai et al.

(10) Patent No.: US 9,563,038 B2
(45) Date of Patent: Feb. 7, 2017

(54) SIX-PIECE OPTICAL LENS SYSTEM

(71) Applicant: NEWMAX TECHNOLOGY CO., LTD., Taichung (TW)

(72) Inventors: Fei-Hsin Tsai, Taichung (TW); Shu-Tzu Lai, Taichung (TW)

(73) Assignee: Newmax Technology Co., Ltd., Taichung (TW)

( * ) Notice: Subject to any disclaimer, the term of this patent is extended or adjusted under 35 U.S.C. 154(b) by 43 days.

(21) Appl. No.: 14/621,349

(22) Filed: Feb. 12, 2015

(65) Prior Publication Data

US 2016/0238820 A1   Aug. 18, 2016

(51) Int. Cl.
*G02B 3/02* (2006.01)
*G02B 21/02* (2006.01)
*G02B 13/04* (2006.01)
*G02B 9/62* (2006.01)
*G02B 13/00* (2006.01)

(52) U.S. Cl.
CPC .................. *G02B 13/0045* (2013.01)

(58) Field of Classification Search
CPC ......... G02B 13/18; G02B 13/04; G02B 13/00; G02B 9/02; G02B 15/177; G02B 15/173; G02B 13/08; G02B 21/02; G02B 3/00

USPC ................ 359/713, 752, 756–757, 797, 708, 359/682–683, 671, 658, 642, 362, 717

See application file for complete search history.

(56) References Cited

U.S. PATENT DOCUMENTS

2015/0370042 A1* 12/2015 Chen .................. G02B 13/0045
                                                    359/713

* cited by examiner

*Primary Examiner* — Dawayne A Pinkney
(74) *Attorney, Agent, or Firm* — Bruce Stone LLP; Joseph Bruce

(57) ABSTRACT

A six-piece optical lens system includes, in order from the object side to the image side: a stop, a first lens element with a positive refractive power has a convex object-side surface; a second lens element with a negative refractive power has a convex object-side surface; a third lens element with a positive refractive power has a concave image-side surface; a fourth lens element with a negative refractive power has a concave image-side surface; a fifth lens element with a positive refractive power has a convex object-side surface; a sixth lens element with a negative refractive power has a concave object-side surface, and at least one of object-side and image-side surfaces of each lens element is aspheric. Thereby, such a system can be applied to a high resolution mobile phone.

13 Claims, 4 Drawing Sheets

SIX-PIECE OPTICAL LENS SYSTEM

BACKGROUND OF THE INVENTION

Field of the Invention

The present invention relates to an optical lens system, and more particularly to a six-piece optical lens system.

Description of the Prior Art

In recent years, with the popularity of the mobile phone cameras, the optical lens system has become smaller in size, and the electronic sensor of a general digital camera is typically a CCD (Charge Coupled Device) or CMOS (Complementary Metal Oxide Semiconductor) sensor. Due to advances in semiconductor manufacturing, the pixel size of sensor has been reduced continuously, and miniaturized optical lens systems have increasingly higher resolution. Therefore, there's an increasing demand for an imaging lens system with better image quality.

Conventional miniaturized lens systems used in portable electronic products mostly consist of four lens elements, however, the resolution of the mobile phone camera has been improved rapidly. As the pixel size of electronic imaging sensors gradually becomes smaller and smaller, the system requires higher image quality, and miniaturization and high performance have become the trend of modern electronic products. The conventional optical lens system comprising four lens elements cannot satisfy the requirements of higher resolution optical lens systems.

The present invention mitigates and/or obviates the aforementioned disadvantages.

SUMMARY OF THE INVENTION

The primary objective of the present invention is to provide a six-piece optical lens system without having an excessively long total track length, the six-piece optical lens system not only can be applied to a high resolution mobile phone, but also has a wide field of view, big stop, high pixel, high resolution and low height.

A six-piece optical lens system in accordance with the present invention comprises, in order from the object side to the image side: a stop, a first lens element with a positive refractive power having a convex object-side surface, at least one of the object-side and an image-side surfaces of the first lens element being aspheric; a second lens element with a negative refractive power having a convex object-side surface, at least one of the object-side and an image-side surfaces of the second lens element being aspheric; a third lens element with a positive refractive power having a concave image-side surface, at least one of an object-side and the image-side surfaces of the third lens element being aspheric; a fourth lens element with a negative refractive power having a concave image-side surface, at least one of an object-side and the image-side surfaces of the fourth lens element being aspheric; a fifth lens element with a positive refractive power having a convex object-side surface, at least one of the object-side and an image-side surfaces of the fifth lens element being aspheric; and a sixth lens element with a negative refractive power having a concave object-side surface, at least one of the object-side and an image-side surfaces of the sixth lens element being aspheric.

Therefore, such a six-piece optical lens system will not have an excessively long total track length, the six-piece optical lens system not only can be applied to a high resolution mobile phone, but also has a wide field of view, big stop, high pixel, high resolution and low height.

Preferably, the focal length of the first lens element is f1, the focal length of the second lens element is f2, and they satisfy the relation: $-0.75 < f1/f2 < -0.35$. If f1/f2 satisfies the above relation, a wide field of view, big stop, high pixel and low height can be provided and the resolution can be improved evidently. Contrarily, if f1/f2 exceeds the above range, the performance and resolution of the optical lens system with a wide field of view will be reduced, and the yield rate will be low.

Preferably, the focal length of the second lens element is f2, the focal length of the third lens element is f3, and they satisfy the relation: $-0.5 < f2/f3 < -0.1$. If f2/f3 satisfies the above relation, a wide field of view, big stop, high pixel and low height can be provided and the resolution can be improved evidently. Contrarily, if f2/f3 exceeds the above range, the performance and resolution of the optical lens system with a wide field of view will be reduced, and the yield rate will be low.

Preferably, the focal length of the third lens element is f3, the focal length of the fourth lens element is f4, and they satisfy the relation: $-3.0 < f3/f4 < -1.5$. If f3/f4 satisfies the above relation, a wide field of view, big stop, high pixel and low height can be provided and the resolution can be improved evidently. Contrarily, if f3/f4 exceeds the above range, the performance and resolution of the optical lens system with a wide field of view will be reduced, and the yield rate will be low.

Preferably, the focal length of the fourth lens element is f4, the focal length of the fifth lens element is f5, and they satisfy the relation: $-5.5 < f4/f5 < -3.5$. If f4/f5 satisfies the above relation, a wide field of view, big stop, high pixel and low height can be provided and the resolution can be improved evidently. Contrarily, if f4/f5 exceeds the above range, the performance and resolution of the optical lens system with a wide field of view will be reduced, and the yield rate will be low.

Preferably, the focal length of the fifth lens element is f5, the focal length of the sixth lens element is f6, and they satisfy the relation: $-1.3 < f5/f6 < -0.8$. If f5/f6 satisfies the above relation, a wide field of view, big stop, high pixel and low height can be provided and the resolution can be improved evidently. Contrarily, if f5/f6 exceeds the above range, the performance and resolution of the optical lens system with a wide field of view will be reduced, and the yield rate will be low.

Preferably, the focal length of the first lens element and the second lens element combined is f12, the focal length of the third lens element and the fourth lens element combined is f34, and they satisfy the relation: $-0.5 < f12/f34 < -0.1$. If f12/f34 satisfies the above relation, a wide field of view, big stop, high pixel and low height can be provided and the resolution can be improved evidently. Contrarily, if f12/f34 exceeds the above range, the performance and resolution of the optical lens system with a wide field of view will be reduced, and the yield rate will be low.

Preferably, the focal length of the third lens element and the fourth lens element combined is f34, the focal length of the fifth lens element and the sixth lens element combined is f56, and they satisfy the relation: $-1.9 < f34/f56 < -1.3$. If f34/f56 satisfies the above relation, a wide field of view, big stop, high pixel and low height can be provided and the resolution can be improved evidently. Contrarily, if f34/f56 exceeds the above range, the performance and resolution of the optical lens system with a wide field of view will be reduced, and the yield rate will be low.

Preferably, the focal length of the second lens element and the third lens element combined is f23, the focal length of the fourth lens element and the fifth lens element combined is f45, and they satisfy the relation: −4.0<f23/f45<−2.5. If f23/f45 satisfies the above relation, a wide field of view, big stop, high pixel and low height can be provided and the resolution can be improved evidently. Contrarily, if f23/f45 exceeds the above range, the performance and resolution of the optical lens system with a wide field of view will be reduced, and the yield rate will be low.

Preferably, the focal length of the first lens element, the second lens element and the third lens element combined is f123, the focal length of the six-piece optical lens system is f, and they satisfy the relation: 0.7<f123/f<1.4. If f123/f satisfies the above relation, a wide field of view, big stop, high pixel and low height can be provided and the resolution can be improved evidently. Contrarily, if f123/f exceeds the above range, the performance and resolution of the optical lens system with a wide field of view will be reduced, and the yield rate will be low.

Preferably, the focal length of the fourth lens element, the fifth lens element and the sixth lens element combined is f456, the focal length of the six-piece optical lens system is f, and they satisfy the relation: −9.0<f456/f<−2.5. If f456/f satisfies the above relation, a wide field of view, big stop, high pixel and low height can be provided and the resolution can be improved evidently. Contrarily, if f456/f exceeds the above range, the performance and resolution of the optical lens system with a wide field of view will be reduced, and the yield rate will be low.

Preferably, the focal length of the first lens element and the second lens element combined is f12, the focal length of the third lens element, the fourth lens element and the fifth lens element combined is f345, and they satisfy the relation: 1.8<f12/f345<2.6. If f12/f345 satisfies the above relation, a wide field of view, big stop, high pixel and low height can be provided and the resolution can be improved evidently. Contrarily, if f12/f345 exceeds the above range, the performance and resolution of the optical lens system with a wide field of view will be reduced, and the yield rate will be low.

Preferably, the focal length of the second lens element, the third lens element and the fourth lens element combined is f234, the focal length of the fifth lens element and the sixth lens element combined is f56, and they satisfy the relation: −0.55<f234/f56<−0.2. If f234/f56 satisfies the above relation, a wide field of view, big stop, high pixel and low height can be provided and the resolution can be improved evidently. Contrarily, if f234/f56 exceeds the above range, the performance and resolution of the optical lens system with a wide field of view will be reduced, and the yield rate will be low.

Preferably, the focal length of the six-piece optical lens system is f, the distance from the object-side surface of the first lens element to the image plane along the optical axis is TL, and they satisfy the relation: 0.6<f/TL<1.0. If f/TL satisfies the above relation, a wide field of view, big stop, high pixel and low height can be provided and the resolution can be improved evidently. Contrarily, if f/TL exceeds the above range, the performance and resolution of the optical lens system with a wide field of view will be reduced, and the yield rate will be low.

The present invention will be presented in further details from the following descriptions with the accompanying drawings, which show, for purpose of illustrations only, the preferred embodiments in accordance with the present invention.

DETAILED DESCRIPTION OF THE PREFERRED EMBODIMENTS

Figure 1A:
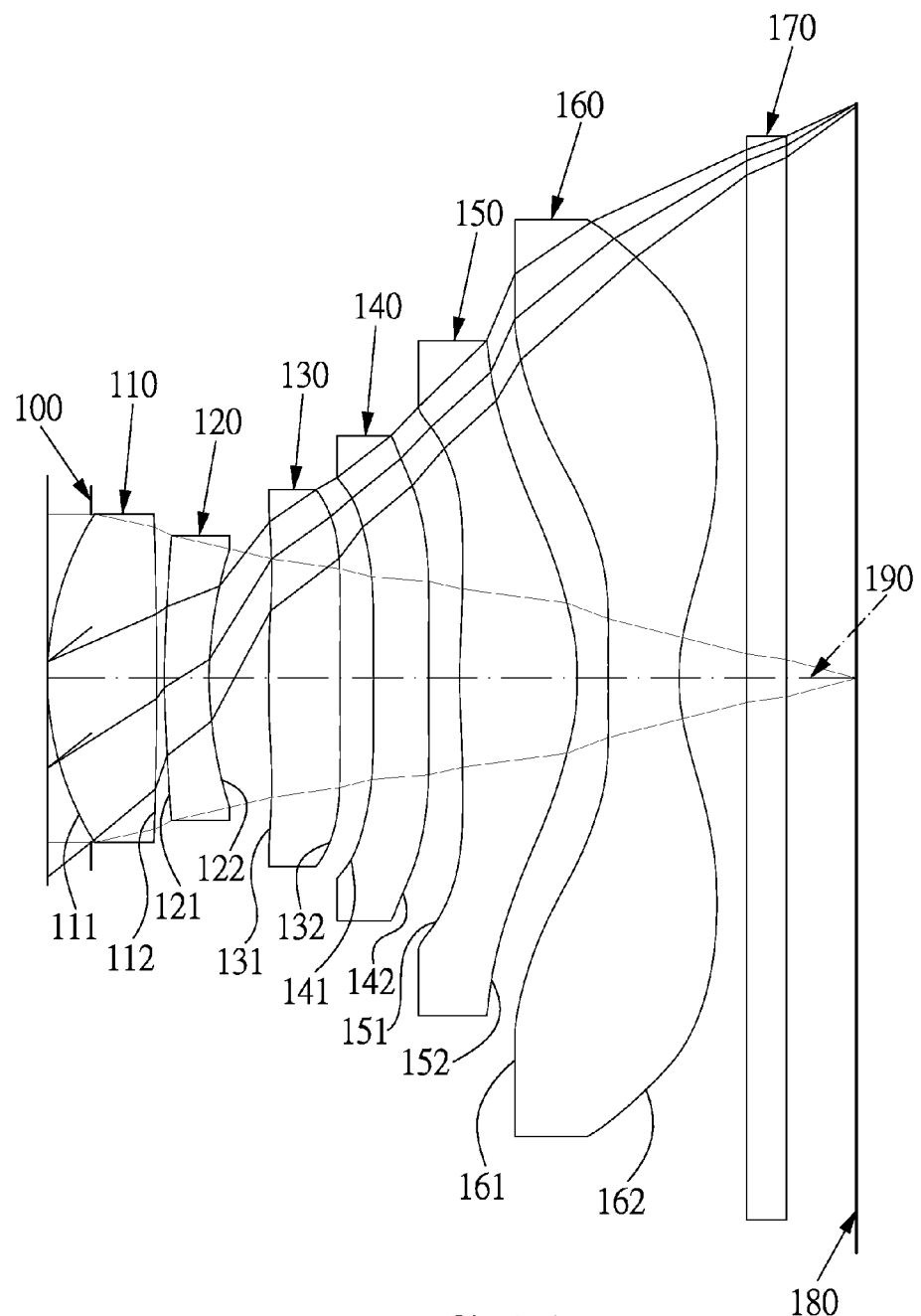
FIG. 1A shows a six-piece optical lens system in accordance with a first embodiment of the present invention.
Figure 1B:
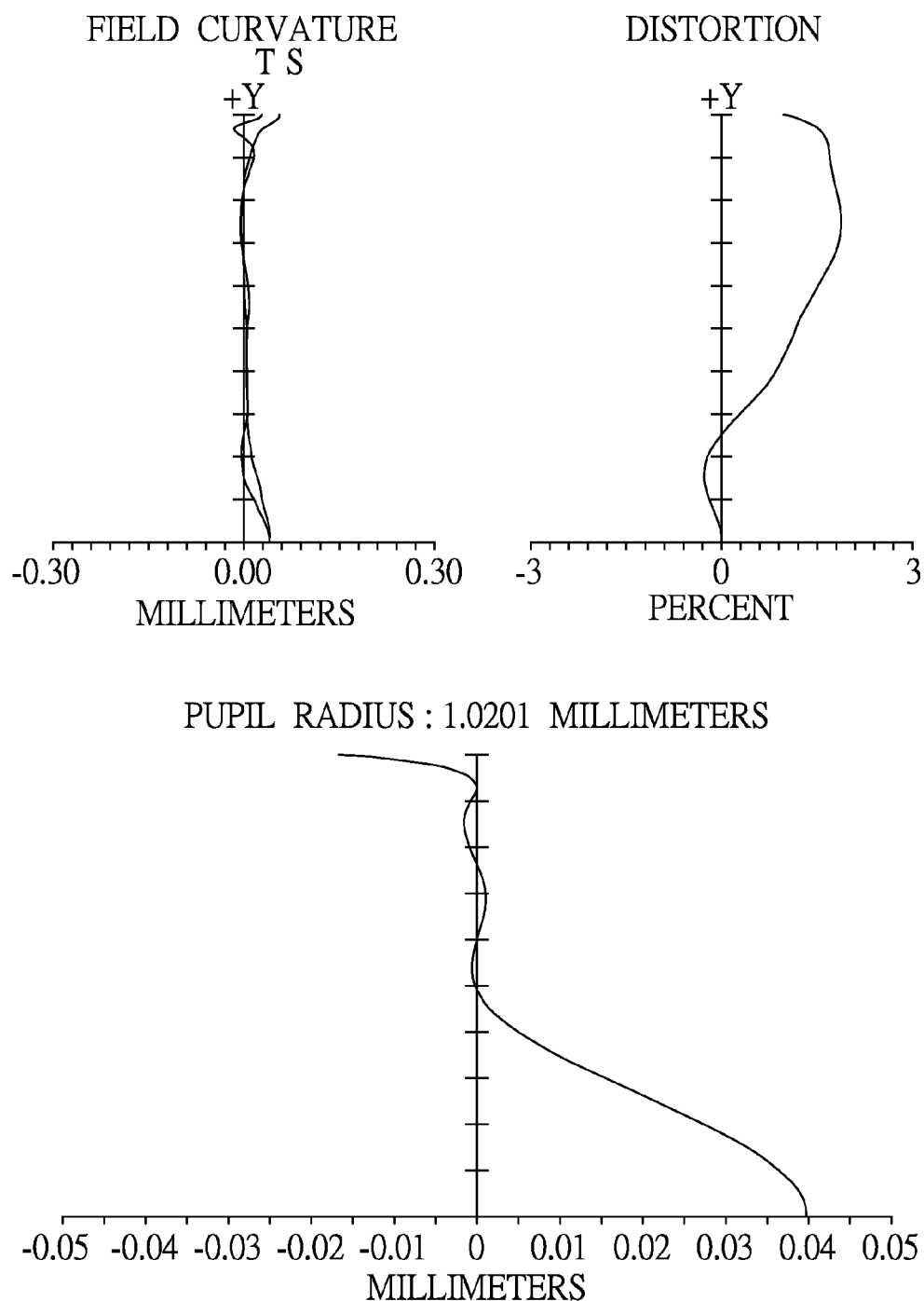
FIG. 1B shows the longitudinal spherical aberration curve, the astigmatic field curve and the distortion curve of the first embodiment of the present invention.

FIG. 1A shows a six-piece optical lens system in accordance with a first embodiment of the present invention, and FIG. 1B shows the astigmatic field curves, the distortion curve and the longitudinal spherical aberration curves of the first embodiment of the present invention. A six-piece optical lens system in accordance with the first embodiment of the present invention comprises a stop 100 and an optical assembly. The optical assembly comprises, in order from the object side to the image side: a first lens element 110, a second lens element 120, a third lens element 130, a fourth lens element 140, a fifth lens element 150, a sixth lens element 160, an IR cut filter 170 and an image plane 180, wherein the six-piece optical lens system has a total of six lens elements with refractive power. The stop 100 is located between an image-side surface 112 of the first lens element 110 and an object to be photographed.

The first lens element 110 with a positive refractive power has an object-side surface 111 being convex near an optical axis 190 and the image-side surface 112 being concave near the optical axis 190, the object-side surface 111 and the image-side surface 112 are aspheric, and the first lens element 110 is made of plastic material.

The second lens element 120 with a negative refractive power has an object-side surface 121 being convex near the optical axis 190 and an image-side surface 122 being concave near the optical axis 190, the object-side surface 121 and the image-side surface 122 are aspheric, and the second lens element 120 is made of plastic material.

The third lens element 130 with a positive refractive power has an object-side surface 131 being convex near the optical axis 190 and an image-side surface 132 being concave near the optical axis 190, the object-side surface 131 and the image-side surface 132 are aspheric, and the third lens element 130 is made of plastic material.

The fourth lens element 140 with a negative refractive power has an object-side surface 141 being concave near the optical axis 190 and an image-side surface 142 being concave near the optical axis 190, the object-side surface 141 and the image-side surface 142 are aspheric, and the fourth lens element 140 is made of plastic material.

The fifth lens element 150 with a positive refractive power has an object-side surface 151 being convex near the optical axis 190 and an image-side surface 152 being convex near the optical axis 190, the object-side surface 151 and the image-side surface 152 are aspheric, and the fifth lens element 150 is made of plastic material.

The sixth lens element 160 with a negative refractive power has an object-side surface 161 being concave near the optical axis 190 and an image-side surface 162 being concave near the optical axis 190, the object-side surface 161 and the image-side surface 162 are aspheric, and the sixth lens element 160 is made of plastic material.

The IR cut filter 170 made of glass is located between the sixth lens element 160 and the image plane 180 and has no influence on the focal length of the six-piece optical lens system.

The equation for the aspheric surface profiles of the first embodiment is expressed as follows:

$$z = \frac{ch^2}{1+[1-(k+1)c^2h^2]^{0.5}} + Ah^4 + Bh^6 + Ch^8 + Dh^{10} + Eh^{12} + Gh^{14} + \ldots$$

wherein:

z represents the value of a reference position with respect to a vertex of the surface of a lens and a position with a height h along the optical axis 190;

k represents the conic constant;

c represents the reciprocal of the radius of curvature;

A, B, C, D, E, G, . . . : represent the high-order aspheric coefficients.

In the first embodiment of the present six-piece optical lens system, the focal length of the six-piece optical lens system is f, the f-number of the six-piece optical lens system is Fno, the field of view of the six-piece optical lens system is 2ω, and they satisfy the relations:

f=4.3690 mm;
Fno=2.0; and
2ω=79°.

In the first embodiment of the present six-piece optical lens system, the focal length of the first lens element 110 is f1, the focal length of the second lens element 120 is f2, and they satisfy the relation:

$f1/f2=-0.5485$.

In the first embodiment of the present six-piece optical lens system, the focal length of the second lens element 120 is f2, the focal length of the third lens element 130 is f3, and they satisfy the relation:

$f2/f3=-0.3065$.

In the first embodiment of the present six-piece optical lens system, the focal length of the third lens element 130 is f3, the focal length of the fourth lens element 140 is f4, and they satisfy the relation:

$f3/f4=-1.9723$.

In the first embodiment of the present six-piece optical lens system, the focal length of the fourth lens element 140 is f4, the focal length of the fifth lens element 150 is f5, and they satisfy the relation:

$f4/f5=-4.4327$.

In the first embodiment of the present six-piece optical lens system, the focal length of the fifth lens element 150 is f5, the focal length of the sixth lens element 160 is f6, and they satisfy the relation:

$f5/f6=-1.1126$.

In the first embodiment of the present six-piece optical lens system, the focal length of the first lens element 110 and the second lens element 120 combined is f12, the focal length of the third lens element 130 and the fourth lens element 140 combined is f34, and they satisfy the relation:

$f12/f34=-0.2568$.

In the first embodiment of the present six-piece optical lens system, the focal length of the third lens element 130 and the fourth lens element 140 combined is f34, the focal length of the fifth lens element 150 and the sixth lens element 160 combined is f56, and they satisfy the relation:

$f34/f56=-1.6294$.

In the first embodiment of the present six-piece optical lens system, the focal length of the second lens element 120 and the third lens element 130 combined is f23, the focal length of the fourth lens element 140 and the fifth lens element 150 combined is f45, and they satisfy the relation:

$f23/f45=-3.2717$.

In the first embodiment of the present six-piece optical lens system, the focal length of the first lens element 110, the second lens element 120 and the third lens element 130 combined is f123, the focal length of the six-piece optical lens system is f, and they satisfy the relation:

$f123/f=1.1019$.

In the first embodiment of the present six-piece optical lens system, the focal length of the fourth lens element 140, the fifth lens element 150 and the sixth lens element 160 combined is f456, the focal length of the six-piece optical lens system is f, and they satisfy the relation:

$f456/f=-4.7365$.

In the first embodiment of the present six-piece optical lens system, the focal length of the first lens element 110 and the second lens element 120 combined is f12, the focal length of the third lens element 130, the fourth lens element 140 and the fifth lens element 150 combined is f345, and they satisfy the relation:

$f12/f345=2.2310$.

In the first embodiment of the present six-piece optical lens system, the focal length of the second lens element 120, the third lens element 130 and the fourth lens element 140 combined is f234, the focal length of the fifth lens element 150 and the sixth lens element 160 combined is f56, and they satisfy the relation:

$f234/f56=-0.3270$.

In the first embodiment of the present six-piece optical lens system, the focal length of the six-piece optical lens system is f, the distance from the object-side surface 111 of the first lens element 110 to the image plane 180 along the optical axis 190 is TL, and they satisfy the relation:

$f/TL=0.8312$.

The detailed optical data of the first embodiment is shown in table 1, and the aspheric surface data is shown in table 2.

TABLE 1

(Embodiment 1)
f(focal length) = 4.369 mm, Fno = 2.0, 2ω = 79°..

| Surface # | | Curvature Radius | Thickness | Material | nd | vd |
|---|---|---|---|---|---|---|
| 0 | Object | Infinity | Infinity | | | |
| 1 | | Infinity | 0.292 | | | |

TABLE 1-continued (Embodiment 1)
f(focal length) = 4.369 mm, Fno = 2.0, 2ω = 79 °..

| Surface # | | Curvature Radius | Thickness | Material | nd | vd |
|---|---|---|---|---|---|---|
| 2 | STO | Infinity | −0.292 | | | |
| 3 | Lens 1 | 1.795565(ASP) | 0.704700 | Plastic | 1.535 | 56 |
| 4 | | 88.820696(ASP) | 0.064201 | | | |
| 5 | Lens 2 | 6.372240(ASP) | 0.285876 | Plastic | 1.634 | 23.9 |
| 6 | | 2.403316(ASP) | 0.386835 | | | |
| 7 | Lens 3 | 7.890255(ASP) | 0.463117 | Plastic | 1.535 | 56 |
| 8 | | 28.195597(ASP) | 0.218437 | | | |
| 9 | Lens 4 | −90.425417(ASP) | 0.349406 | Plastic | 1.634 | 23.9 |
| 10 | | 7.092555(ASP) | 0.214319 | | | |
| 11 | Lens 5 | 6.927215(ASP) | 0.758290 | Plastic | 1.535 | 56 |
| 12 | | −1.457245(ASP) | 0.202315 | | | |
| 13 | Lens 6 | −52.366289(ASP) | 0.455155 | Plastic | 1.535 | 56 |
| 14 | | 1.145254(ASP) | 0.444328 | | | |
| 15 | IR-filter | Infinity | 0.245427 | Glass | 1.5168 | 64.16734 |
| 16 | | Infinity | 0.463621 | | | |
| 17 | Image | Infinity | | | | |

TABLE 2

Aspheric Coefficients

| | Surface # | | | | | |
|---|---|---|---|---|---|---|
| | 3 | 4 | 5 | 6 | 7 | 8 |
| K = | −1.83376 | −900.119 | −33.793 | −2.85089 | −17.5837 | −682.934 |
| A = | 0.03836 | −0.0945 | −0.1333 | −0.06381 | −0.05317 | −0.05859 |
| B = | 0.000607 | 0.253094 | 0.34627 | 0.194783 | −0.02878 | −0.00197 |
| C = | −0.01388 | −0.35072 | −0.4217 | −0.1874 | 0.06305 | −0.03465 |
| D = | 0.027327 | 0.237744 | 0.25634 | 0.100522 | −0.05931 | 0.041748 |
| E = | −0.02373 | −0.08803 | −0.0751 | −0.01707 | 0.024401 | −0.02635 |
| F = | 0.004364 | 0.012156 | 0.00875 | −5.60E−05 | −0.0056 | 0.004338 |

| | Surface # | | | | | |
|---|---|---|---|---|---|---|
| | 9 | 10 | 11 | 12 | 13 | 14 |
| K = | 600.042 | −295.447 | 2.687125 | −6.81124 | −913.42 | −6.73762 |
| A = | −0.1191 | −0.12395 | −0.09375 | −0.05063 | −0.2027 | −0.08509 |
| B = | 0.0688 | 0.057066 | 0.042748 | 0.030625 | 0.08845 | 0.031303 |
| C = | −0.0418 | −0.01899 | −0.02066 | −0.00631 | −0.0175 | −0.00747 |
| D = | 0.01125 | 0.003003 | 0.003861 | 0.000596 | 0.00186 | 0.001048 |
| E = | −0.0022 | −0.00027 | −0.00024 | −2.50E−05 | −0.0001 | −8.30E−05 |
| F = | −0.0013 | 0.000113 | 0.000029 | 0 | 2E−06 | 0.000003 |

The units of the radius of curvature, the thickness and the focal length in table 1 are expressed in mm, the surface numbers 0-17 represent the surfaces sequentially arranged from the object-side to the image-side along the optical axis. In table 2, k represents the conic coefficient of the equation of the aspheric surface profiles, and A, B, C, D, E, F, . . . : represent the high-order aspheric coefficients. In the tables 1 and 2, the surfaces 3 and 4 represent the object-side surface 111 and the image-side surface 112 of the first lens element 110, respectively, the surfaces 5 and 6 represent the object-side surface 121 and the image-side surface 122 of the second lens element 120, respectively, the surfaces 7 and 8 represent the object-side surface 131 and the image-side surface 132 of the third lens element 130, respectively, the surfaces 9 and 10 represent the object-side surface 141 and the image-side surface 142 of the fourth lens element 140, respectively, the surfaces 11 and 12 represent the object-side surface 151 and the image-side surface 152 of the fifth lens element 150, respectively, and the surfaces 13 and 14 represent the object-side surface 161 and the image-side surface 162 of the sixth lens element 160, respectively.

The tables presented below for each embodiment are the corresponding schematic parameter and the astigmatic field curves, the distortion curve and the longitudinal spherical aberration curves, and the definitions of the tables are the same as Table 1 and Table 2 of the first embodiment. Therefore, an explanation in this regard will not be provided again.

Figure 2A:
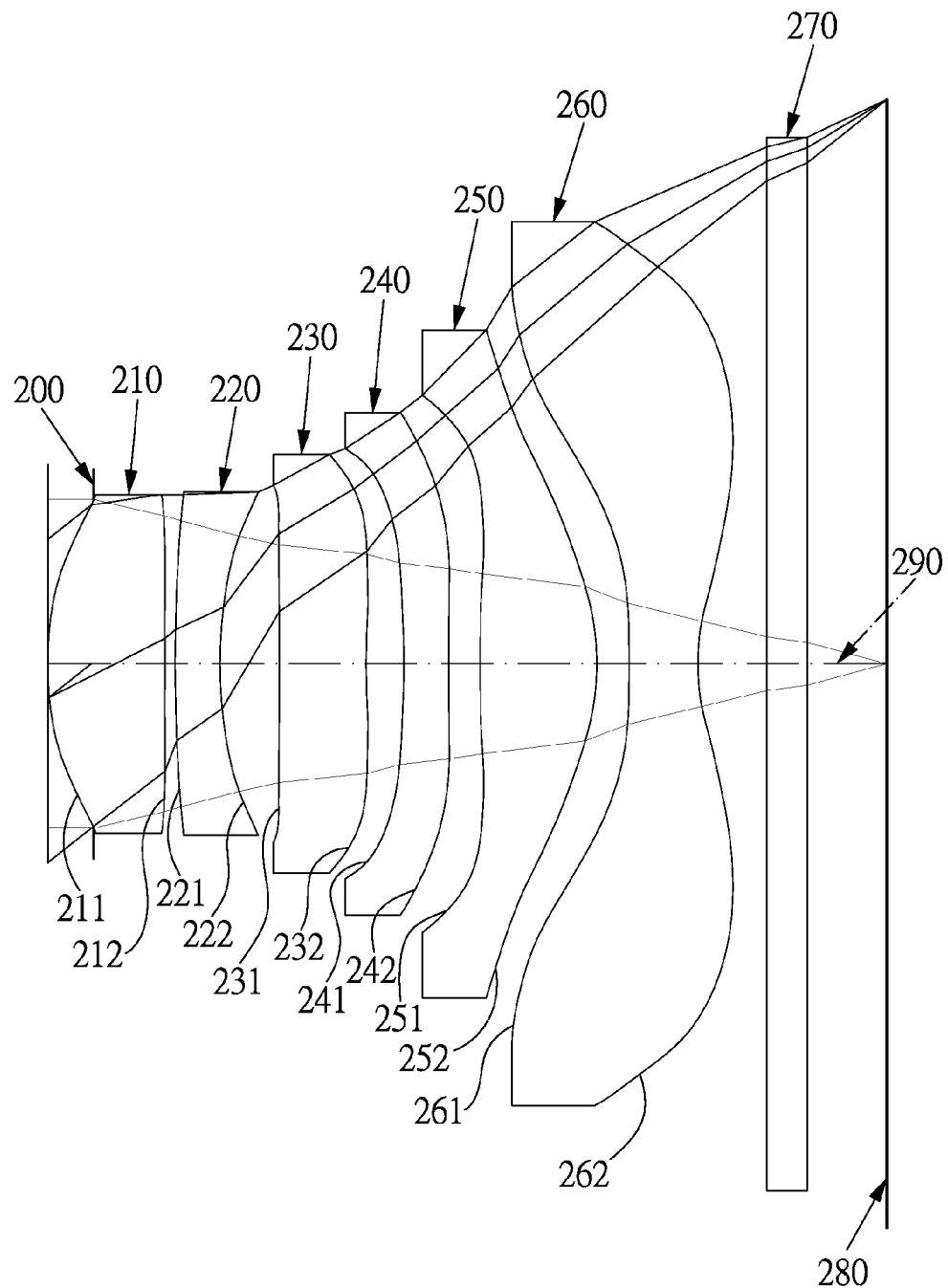
FIG. 2A shows a six-piece optical lens system in accordance with a second embodiment of the present invention.
Figure 2B:
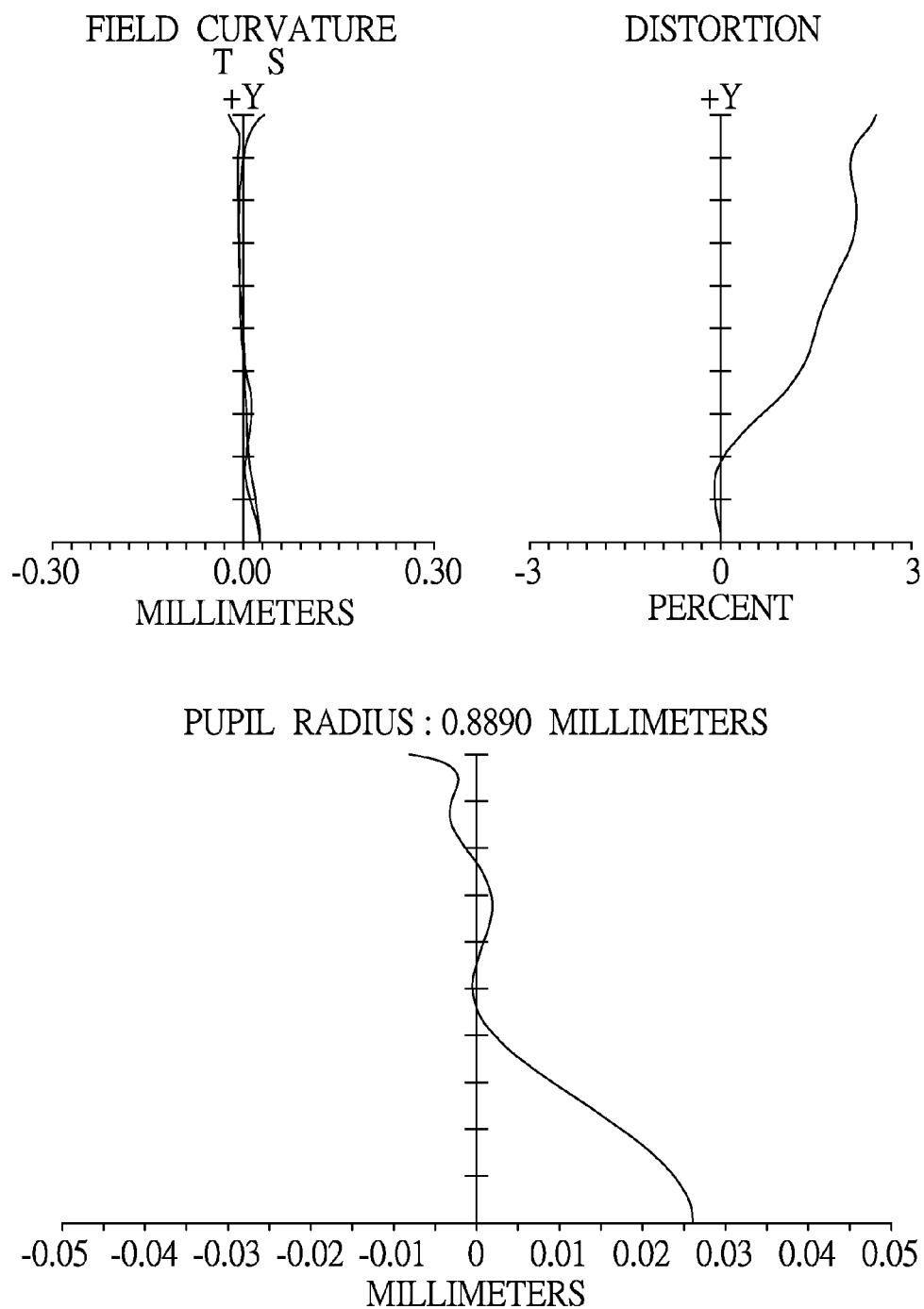
FIG. 2B shows the longitudinal spherical aberration curve, the astigmatic field curve and the distortion curve of the second embodiment of the present invention.

FIG. 2A shows a six-piece optical lens system in accordance with a second embodiment of the present invention, and FIG. 1B shows the astigmatic field curves, the distortion curve and the longitudinal spherical aberration curves of the second embodiment of the present invention. A six-piece optical lens system in accordance with the second embodiment of the present invention comprises a stop 200 and an optical assembly. The optical assembly comprises, in order from the object side to the image side: a first lens element 210, a second lens element 220, a third lens element 230, a fourth lens element 240, a fifth lens element 250, a sixth lens element 260, an IR cut filter 270 and an image plane 280, wherein the six-piece optical lens system has a total of six lens elements with refractive power. The stop 200 is located between an image-side surface 212 of the first lens element 210 and an object to be photographed.

The first lens element 210 with a positive refractive power has an object-side surface 211 being convex near an optical axis 290 and the image-side surface 212 being concave near the optical axis 290, the object-side surface 211 and the image-side surface 212 are aspheric, and the first lens element 210 is made of plastic material.

The second lens element 220 with a negative refractive power has an object-side surface 221 being convex near the optical axis 290 and an image-side surface 222 being concave near the optical axis 290, the object-side surface 221 and the image-side surface 222 are aspheric, and the second lens element 220 is made of plastic material.

The third lens element 230 with a positive refractive power has an object-side surface 231 being convex near the optical axis 290 and an image-side surface 232 being concave near the optical axis 290, the object-side surface 231 and the image-side surface 232 are aspheric, and the third lens element 230 is made of plastic material.

The fourth lens element 240 with a negative refractive power has an object-side surface 241 being concave near the optical axis 290 and an image-side surface 242 being concave near the optical axis 290, the object-side surface 241 and the image-side surface 242 are aspheric, and the fourth lens element 240 is made of plastic material.

The fifth lens element 250 with a positive refractive power has an object-side surface 251 being convex near the optical axis 290 and an image-side surface 252 being convex near the optical axis 290, the object-side surface 251 and the image-side surface 252 are aspheric, and the fifth lens element 250 is made of plastic material.

The sixth lens element 260 with a negative refractive power has an object-side surface 261 being concave near the optical axis 290 and an image-side surface 262 being concave near the optical axis 290, the object-side surface 261 and the image-side surface 262 are aspheric, and the sixth lens element 260 is made of plastic material.

The IR cut filter 270 made of glass is located between the sixth lens element 260 and the image plane 280 and has no influence on the focal length of the six-piece optical lens system.

The detailed optical data of the second embodiment is shown in table 3, and the aspheric surface data is shown in table 4.

TABLE 3

(Embodiment 2)
f(focal length) = 3.807 mm, Fno = 2.0, 2ω = 77°..

| Surface # | | Curvature Radius | Thickness | Material | nd | vd |
|---|---|---|---|---|---|---|
| 0 | Object | Infinity | Infinity | | | |
| 1 | | Infinity | 0.250 | | | |
| 2 | STO | Infinity | −0.250 | | | |
| 3 | Lens 1 | 1.567637(ASP) | 0.652266 | Plastic | 1.535 | 56 |
| 4 | | 66.210625(ASP) | 0.052988 | | | |
| 5 | Lens 2 | 6.629598(ASP) | 0.240000 | Plastic | 1.634 | 23.9 |
| 6 | | 2.137533(ASP) | 0.320692 | | | |
| 7 | Lens 3 | 8.175850(ASP) | 0.489266 | Plastic | 1.535 | 56 |
| 8 | | 29.239840(ASP) | 0.190018 | | | |
| 9 | Lens 4 | −137.724731(ASP) | 0.250000 | Plastic | 1.634 | 23.9 |
| 10 | | 5.790539(ASP) | 0.171994 | | | |
| 11 | Lens 5 | 4.950868(ASP) | 0.641900 | Plastic | 1.535 | 56 |
| 12 | | −1.271821(ASP) | 0.170839 | | | |
| 13 | Lens 6 | −11.729790(ASP) | 0.385000 | Plastic | 1.535 | 56 |
| 14 | | 1.084237(ASP) | 0.380190 | | | |
| 15 | IR-filter | Infinity | 0.210000 | Glass | 1.5168 | 64.16734 |
| 16 | | Infinity | 0.444847 | | | |
| 17 | Image | Infinity | | | | |

TABLE 4

Aspheric Coefficients

| | Surface # | | | | | |
|---|---|---|---|---|---|---|
| | 3 | 4 | 5 | 6 | 7 | 8 |
| K = | −1.8922 | 171.312 | −36.719 | −3.2551 | −14.695 | −185.26 |
| A = | 0.06033 | −0.1487 | −0.2141 | −0.1059 | −0.0829 | −0.0852 |
| B = | 0.00251 | 0.55085 | 0.75336 | 0.42145 | −0.0548 | 0.00547 |
| C = | −0.0413 | −1.0433 | −1.2561 | −0.5577 | 0.18374 | −0.1022 |
| D = | 0.11164 | 0.9697 | 1.04513 | 0.40774 | −0.2469 | 0.1697 |
| E = | −0.1289 | −0.4855 | −0.4148 | −0.0973 | 0.13868 | −0.1438 |
| F = | 0.03982 | 0.0983 | 0.06364 | 0.00183 | −0.0274 | 0.03872 |

| | Surface # | | | | | |
|---|---|---|---|---|---|---|
| | 9 | 10 | 11 | 12 | 13 | 14 |
| K = | 200 | −200 | 1.07614 | −6.1865 | −107.14 | −7.3358 |
| A = | −0.1898 | −0.2007 | −0.1511 | −0.0848 | −0.325 | −0.1365 |
| B = | 0.14976 | 0.12236 | 0.09282 | 0.06596 | 0.19283 | 0.06851 |
| C = | −0.123 | −0.0568 | −0.0622 | −0.0189 | −0.0521 | −0.0223 |

TABLE 4-continued

| Aspheric Coefficients | | | | | | |
|---|---|---|---|---|---|---|
| D = | 0.04884 | 0.01216 | 0.01534 | 0.0024 | 0.00755 | 0.00425 |
| E = | −0.0091 | −0.0016 | −0.0016 | −0.0001 | −0.0006 | −0.0005 |
| F = | −0.0083 | 0.00079 | 6.5E−05 | 3E−06 | 1.7E−05 | 2.2E−05 |

In the second embodiment, the equation of the aspheric surface profiles of the aforementioned lens elements is the same as the equation of the first embodiment. Also, the definitions of these parameters shown in the following table are the same as those stated in the first embodiment with corresponding values for the second embodiment, so an explanation in this regard will not be provided again.

Moreover, these parameters can be calculated from Table 3 and Table 4 as the following values and satisfy the following conditions:

| Embodiment 2 | | | |
|---|---|---|---|
| f | 3.807 | f12/f34 | −0.3178 |
| Fno | 2 | f34/f56 | −1.5943 |
| 2ω | 77 | f23/f45 | −3.2333 |
| f1/f2 | −0.5385 | f123/f | 1.1213 |
| f2/f3 | −0.2639 | f456/f | −6.745 |
| f3/f4 | −2.4159 | f12/f345 | 2.2416 |
| f4/f5 | −4.4391 | f234/f56 | −0.386 |
| f5/f6 | −1.0688 | f/TL | 0.8276 |

In the present six-piece optical lens system, the lens elements can be made of plastic or glass. If the lens elements are made of plastic, the cost will be effectively reduced. If the lens elements are made of glass, there is more freedom in distributing the refractive power of the six-piece optical lens system. Plastic lens elements can have aspheric surfaces, which allow more design parameter freedom (than spherical surfaces), so as to reduce the aberration and the number of the lens elements, as well as the total track length of the six-piece optical lens system.

In the present six-piece optical lens system, if the object-side or the image-side surface of the lens elements with refractive power is convex and the location of the convex surface is not defined, the object-side or the image-side surface of the lens elements near the optical axis is convex. If the object-side or the image-side surface of the lens elements is concave and the location of the concave surface is not defined, the object-side or the image-side surface of the lens elements near the optical axis is concave.

The six-piece optical lens system of the present invention can be used in focusing optical systems and can obtain better image quality. The six-piece optical lens system of the present invention can also be used in electronic imaging systems, such as, 3D image capturing, digital camera, mobile device, digital flat panel or vehicle camera.

While we have shown and described various embodiments in accordance with the present invention, it should be clear to those skilled in the art that further embodiments may be made without departing from the scope of the present invention.

What is claimed is:

1. A six-piece optical lens system comprising, in order from an object side to an image side:
    a stop;
    a first lens element with a positive refractive power having a convex object-side surface, at least one of the object-side and an image-side surfaces of the first lens element being aspheric;
    a second lens element with a negative refractive power having a convex object-side surface, at least one of the object-side and an image-side surfaces of the second lens element being aspheric;
    a third lens element with a positive refractive power having a concave image-side surface, at least one of an object-side and the image-side surfaces of the third lens element being aspheric;
    a fourth lens element with a negative refractive power having a concave image-side surface, at least one of an object-side and the image-side surfaces of the fourth lens element being aspheric;
    a fifth lens element with a positive refractive power having a convex object-side surface, at least one of the object-side and an image-side surfaces of the fifth lens element being aspheric; and
    a sixth lens element with a negative refractive power having a concave object-side surface, at least one of the object-side and an image-side surfaces of the sixth lens element being aspheric;
    wherein a focal length of the first lens element, the second lens element and the third lens element combined is f123, a focal length of the six-piece optical lens system is f, and they satisfy the relation:

$0.7 < f123/f < 1.4$.

2. The six-piece optical lens system as claimed in claim 1, wherein a focal length of the first lens element is f1, a focal length of the second lens element is f2, and they satisfy the relation:

$-0.75 < f1/f2 < -0.35$.

3. The six-piece optical lens system as claimed in claim 1, wherein a focal length of the second lens element is f2, a focal length of the third lens element is f3, and they satisfy the relation:

$-0.5 < f2/f3 < -0.1$.

4. The six-piece optical lens system as claimed in claim 1, wherein a focal length of the third lens element is f3, a focal length of the fourth lens element is f4, and they satisfy the relation:

$-3.0 < f3/f4 < -1.5$.

5. The six-piece optical lens system as claimed in claim 1, wherein a focal length of the fourth lens element is f4, a focal length of the fifth lens element is f5, and they satisfy the relation:

$-5.5 < f4/f5 < -3.5$.

6. The six-piece optical lens system as claimed in claim 1, wherein a focal length of the fifth lens element is f5, a focal length of the sixth lens element is f6, and they satisfy the relation:

$-1.3 < f5/f6 < -0.8$.

7. The six-piece optical lens system as claimed in claim 1, wherein a focal length of the first lens element and the second lens element combined is f12, a focal length of the third lens element and the fourth lens element combined is f34, and they satisfy the relation:

$$-0.5 < f12/f34 < -0.1.$$

8. The six-piece optical lens system as claimed in claim 1, wherein a focal length of the third lens element and the fourth lens element combined is f34, a focal length of the fifth lens element and the sixth lens element combined is f56, and they satisfy the relation:

$$-1.9 < f34/f56 < -1.3.$$

9. The six-piece optical lens system as claimed in claim 1, wherein a focal length of the second lens element and the third lens element combined is f23, a focal length of the fourth lens element and the fifth lens element combined is f45, and they satisfy the relation:

$$-4.0 < f23/f45 < -2.5.$$

10. The six-piece optical lens system as claimed in claim 1, wherein a focal length of the fourth lens element, the fifth lens element and the sixth lens element combined is f456, a focal length of the six-piece optical lens system is f, and they satisfy the relation:

$$-9.0 < f456/f < -2.5.$$

11. The six-piece optical lens system as claimed in claim 1, wherein a focal length of the first lens element and the second lens element combined is f12, a focal length of the third lens element, the fourth lens element and the fifth lens element combined is f345, and they satisfy the relation:

$$1.8 < f12/f345 < 2.6.$$

12. The six-piece optical lens system as claimed in claim 1, wherein a focal length of the second lens element, the third lens element and the fourth lens element combined is f234, a focal length of the fifth lens element and the sixth lens element combined is f56, and they satisfy the relation:

$$-0.55 < f234/f56 < -0.2.$$

13. The six-piece optical lens system as claimed in claim 1, wherein the focal length of the six-piece optical lens system is f, a distance from the object-side surface of the first lens element to an image plane along an optical axis is TL, and they satisfy the relation:

$$0.6 < f/TL < 1.0.$$

* * * * *